RESONATOR MODE TEST SET

Filed Dec. 3, 1957

*INVENTOR.*
GEORGE H. GOUGOULIS
*BY* Harry M. Saragovitz
ATTORNEY

United States Patent Office 2,931,976

Patented Apr. 5, 1960

2,931,976

RESONATOR MODE TEST SET

George H. Gougoulis, Red Bank, N.J., assignor to the United States of America as represented by the Secretary of the Army Application December 3, 1957, Serial No. 700,527

4 Claims. (Cl. 324—56)

(Granted under Title 35, U.S. Code (1952), sec. 266)

The invention described herein may be manufactured and used by or for the Government for governmental purposes, without the payment of any royalty thereon.

This invention relates to a test circuit for determining the amplitude of the modes of oscillation of a resonator, other than the principal mode. Such other modes are generally undesirable since they cause parasitic oscillations in oscillators controlled thereby.

It is an object of the invention to provide a test circuit for this purpose which is relatively simple in structure, which is easy to operate, and which can be constructed of readily available components.

In accordance with the invention, the output of a main oscillator, tuned to the principal mode of the resonator to be tested, is modulated by the output of second oscillator in a mixer, the output of which is tuned to pass the sum and difference frequencies and the main oscillator frequency, i.e., it will pass the carrier and side-band frequencies. These three frequencies are applied through the resonator to the input of the main oscillator, whereby the frequency of the latter is stabilized at the frequency of the principal mode of the resonator. If the latter also possesses strong resonances or modes in the vicinity of the sum or difference frequency, the latter will mix with the main mode frequency in a detector circuit and provide an output frequency equal to that of the second oscillator, i.e., the original modulating frequency. Said output frequency is filtered out and applied to a vacuum tube voltmeter which measures its amplitude.

The features of my invention which I believe to be novel are set forth with particularity in the appended claims. My invention itself, however, both as to its organization and method of operation, together with further objects and advantages thereof, may best be understood by reference to the following description taken in conjunction with the accompanying drawing, in which:

Figure 1:
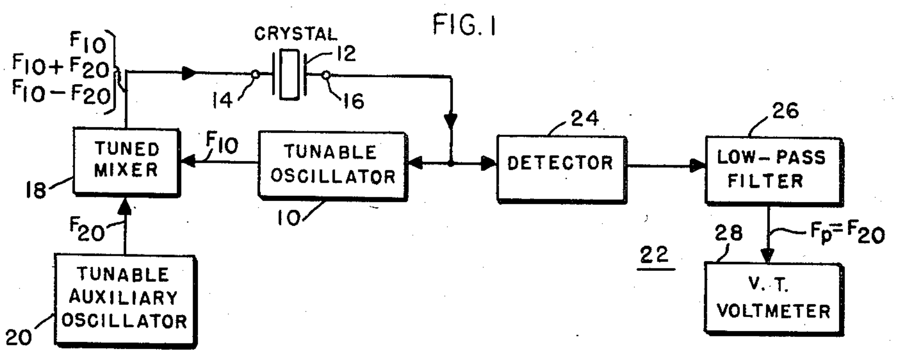
Figure 1 is a block diagram of a preferred embodiment of the invention.

In Figure 1, there is shown a tunable oscillator 10 which is adapted to be tuned over a range encompassing the frequency of a piezoelectric crystal resonator 12 to be tested. Such a crystal is adapted to be connected to terminals 14 and 16. The crystal circuit is so arranged that the oscillator 10 will oscillate when tuned to the principal operating mode of crystal, and will have its frequency stabilized at the frequency of said principal mode.

Strong undesirable modes of oscillation of the crystal are usually of a frequency within ±10% of the principal mode frequency. To detect such modes, the output of oscillator 10 is modulated in a mixer 18 with the output of an oscillator 20, which is tunable over a frequency band of from zero to 10% of the oscillating frequency of oscillator 10. Mixer 18 has its output circuit tuned to eliminate the frequency $F_{20}$ of oscillator 20, but to pass the frequency $F_{10}$ of oscillator 10 and the sum and difference frequencies of oscillators 10 and 20. This is easy to do since the frequency $F_{20}$ is low compared to the other frequencies in the output of mixer 18. The output of the mixer will therefore provide frequencies $F_{10}$ $(F_{10}+F_{20})$, and $(F_{10}-F_{20})$.

These three frequencies are now passed through the crystal under test 12, and from there to the tuned input circuit of oscillator 10, whereby the latter is frequency stabilized at the frequency of the principal mode of the crystal, which is the strongest mode.

Should the crystal have strong parasitic resonances slightly displaced from the principal mode, usually of a frequency displaced within ±10% from the principal mode, these parasitic resonances are detected and measured by the indicator circuit 22, also connected to the output of the crystal, as will be explained hereinafter.

Oscillator 20 is tuned until one of the side-band frequencies applied to the crystal, i.e., $F_{10}+F_{20}$ of $F_{10}-F_{20}$, equals the parasitic mode of the crystal, whereby the latter will respond strongly thereto, and apply it to the input circuit of the electron tube of oscillator 10 where it will be further amplified. The side-band frequencies together with the carrier frequency $F_{10}$ will be applied to detector 24 of indicator circuit 22, where they will be demodulated and yield as one of the components in the output a frequency $F_p$ which equals $$(F_{20}+F_{10})-F_{10}=F_{20}$$

or $F_{10}-(F_{10}-F_{20})=F_{20}$. It will be seen that if the crystal has only one strong mode of vibration, i.e., at the principal mode frequency $F_{10}$, it will suppress the side-band components and no $F_p$ component will appear at the output of detector 24. If a side-band, as well as the carrier, do appear in the crystal output, they will be demodulated by detector 24 to yield the modulation frequency $F_p=F_{20}$. The detector output is applied to a low pass filter which will pass $F_p$ and eliminate all higher frequency products. $F_p$ is then applied to a vacuum tube voltmeter 28 where its amplitude is indicated. The vacuum tube voltmeter can be calibrated in terms of the impedance of the crystal to the parasitic mode frequency.

Figure 2:
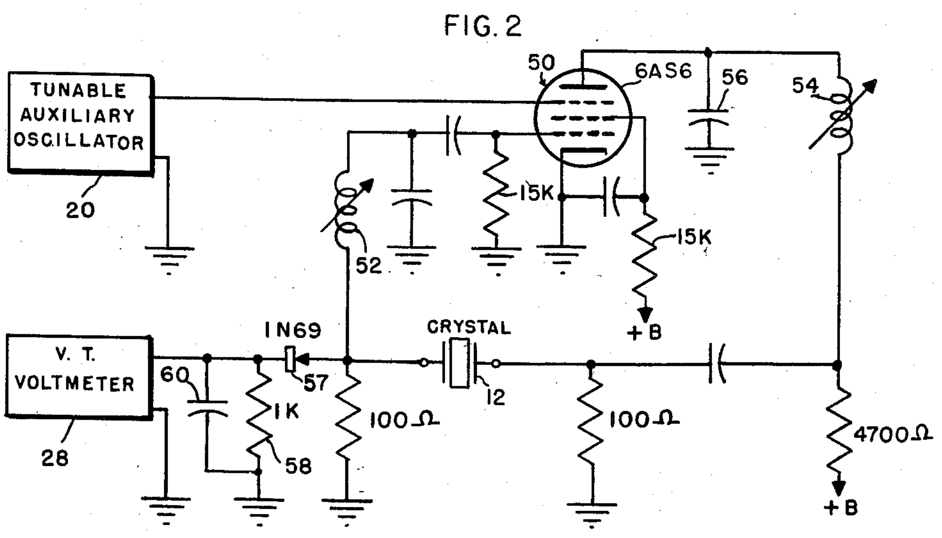
Figure 2 is a schematic circuit diagram of the invention.

Figure 2 shows an example of a practical embodiment of the invention. Tube 40 acts as both the oscillator 10 and the mixer 18 of Figure 1. The oscillator circuit is of the conventional tuned-plate, tuned-grid type. Variable inductance 52 tunes the grid circuit, and variable inductance 54 tunes the plate circuit. The output of auxiliary oscillator 20 is applied to the third grid of tube 50. Since this tube also acts as a mixer, the tuned plate circuit, comprising coil 54 and capacitor 56, should have a band pass wide enough to pass both the upper and lower side band frequencies but reject the relatively low frequency of auxiliary oscillator 20.

The output of crystal 12 is applied through a diode detector 57 to a load resistor 58, which corresponds to detector 24 of Figure 1. Resistor 58 is bypassed by a capacitor which corresponds to filter 26 of Figure 2. The reactance of capacitor 60 should be high to the frequency $F_p$ and low to the higher modulation products, whereby the latter are shorted out, and only $F_p$ impressed upon voltmeter circuit 28. The parameters of the oscillator are such that it will oscillate only if the crystal is in the circuit.

As an example of the frequencies involved, oscillator 10 must be tunable over the range of crystal frequencies to be tested. If these frequencies are, say, in the 10 megacycle region, oscillator 20 will be tunable over a range of 0–1 megacycle if parasitic modes which are up to one megacycle displaced from the principal mode are to be detected.

Summarizing, the above described system comprises a carrier frequency oscillator 10 and a source of modulating frequency 20 therefor to produce side-band frequencies. The carrier frequency oscillator is tuned to the principal mode frequency of the crystal to be tested. The carrier and side-band frequencies are applied through the crystal resonator to the input circuit of the carrier frequency oscillator 10, whereby the latter is stabilized at the frequency of the principal mode of the crystal. The crystal output is also applied to a demodulator circuit which responds only to a modulated carrier. If the crystal also tends to oscillate at a spurious mode in the region of a side-band frequency, it will pass the side-band frequency as well as the carrier frequency, and these will combine in the demodulator to derive the modulation frequency, which is then filtered out and applied to an amplitude measuring device.

Although the invention has been explained in connection with the measurement of parasitic modes of a crystal, it is equally applicable to other types of resonators.

While there has been described what is at present considered a preferred embodiment of the invention, it will be obvious to those skilled in the art that various changes and modifications may be made therein without departing from the invention; and it is aimed in the appended claims to cover all such changes and modifications as fall within the true spirit and scope of the invention.

What is claimed is:

1. A test set for determining the number of modes of a resonator, comprising a main tunable oscillator, means for connecting said resonator to said main tunable oscillator to control the frequency thereof in accordance with the principal mode of oscillation of said resonator, a tunable auxiliary oscillator operating at a frequency which is lower than the frequency of said principal mode, a mixer coupled to said oscillators for heterodyning the outputs thereof, means including said resonator for connecting the output of said mixer through said resonator to an indicating circuit, the latter comprising a detector, a filter coupled to the output of said detector for passing only a frequency in the region of that of said auxiliary oscillator, and means for indicating the output of said filter.

2. A test set for determining the number of modes of a crystal resonator, comprising a main oscillator, means for connecting said resonator to said main oscillator to control the frequency of said oscillator, an auxiliary oscillator operating at a frequency which is a minor fraction of the frequency of the principal mode of said resonator, a mixer coupled to said oscillators for heterodyning the outputs thereof, means in said mixer for suppressing the frequency of said auxiliary oscillator, but passing the frequency of said main oscillator and the sum and difference frequencies of both oscillators, means feeding the output of said mixer through said resonator to an indicating circuit, the latter comprising a detector, a low pass filter tuned to said minor fraction of the principal mode of said resonator coupled to said detector for suppressing said main mode frequency and said sum and difference frequencies, and means to indicate the amplitude of the output of said filter.

3. A test set in accordance with claim 2, wherein said auxiliary oscillator frequency is about 10% of said main oscillator frequency.

4. In a system for determining the existence of a secondary mode of oscillation of a crystal at a given frequency from that of the primary mode of oscillation of said crystal, a mixer having two inputs and one output, an amplifier having an input, and an output connected to one of the inputs of said mixer, a positive feedback network including said crystal connected between the output of said mixer and the input of said amplifier to make it oscillate at the primary mode of said crystal, an auxiliary oscillator tuned to said given frequency connected to the other input of said mixer, a detector connected to the junction of said crystal and the input of said oscillating amplifier to detect any component of said given frequency carried by said crystal, a low pass filter connected to said detector, sensitive to said given frequencies and insensitive to frequencies in the range of the primary mode of said crystal, and a vacuum tube voltmeter connected to said low pass filter to indicate the presence of any of said given frequency carried by a secondary mode of oscillation of said crystal.

References Cited in the file of this patent

UNITED STATES PATENTS

| | | |
|---|---|---|
| 2,463,616 | Harrison | Mar. 8, 1949 |
| 2,534,224 | Brown | Dec. 19, 1950 |

OTHER REFERENCES

Warren et al.: "An Analysis of the Intermodulation Method of Distortion Meas.," IRE Proceedings, April 1948, pages 457–466.